United States Patent
Byrn et al.

(10) Patent No.: US 7,290,224 B2
(45) Date of Patent: Oct. 30, 2007

(54) GUIDED CAPTURE, CREATION, AND SEAMLESS INTEGRATION WITH SCALABLE COMPLEXITY OF A CLOCK SPECIFICATION INTO A DESIGN FLOW OF AN INTEGRATED CIRCUIT

(75) Inventors: Jonathan Byrn, Kasson, MN (US); Grant Lindberg, Pleasanton, CA (US)

(73) Assignee: LSI Corporation, Milpitas, CA (US)

( * ) Notice: Subject to any disclaimer, the term of this patent is extended or adjusted under 35 U.S.C. 154(b) by 342 days.

(21) Appl. No.: 11/027,266

(22) Filed: Dec. 31, 2004

(65) Prior Publication Data

US 2005/0273738 A1   Dec. 8, 2005

Related U.S. Application Data

(60) Provisional application No. 60/579,922, filed on Jun. 15, 2004, provisional application No. 60/577,356, filed on Jun. 3, 2004.

(51) Int. Cl.
*G06F 17/50* (2006.01)
(52) U.S. Cl. .................................. 716/1; 716/3; 716/18
(58) Field of Classification Search ................ 716/1–3, 716/8–14
See application file for complete search history.

(56) References Cited

U.S. PATENT DOCUMENTS

| | | | | |
|---|---|---|---|---|
| 5,867,399 A | * | 2/1999 | Rostoker et al. | 716/18 |
| 6,901,562 B2 | * | 5/2005 | Cooke et al. | 716/1 |
| 6,968,514 B2 | * | 11/2005 | Cooke et al. | 716/1 |

* cited by examiner

*Primary Examiner*—Vuthe Siek
(74) *Attorney, Agent, or Firm*—Suiter Swantz PC LLO

(57) ABSTRACT

A method and tool that capture, create, and integrate a clock specification to achieve a correct-by-construction design flow of a semiconductor product from a partially manufactured semiconductor platform. The clocking elements of the design flow are combined and displayed in a plurality of context-driven views. Within each view, details of the clock specification are presented in the context of the information. A user may zoom in/out through the plurality of views of the design flow for more or less detailed information. Each view can combine the logical, structural, architectural, cost, timing, and other features of the clock in a particular context. A user can zoom in to select and manipulate circuit elements. The user can then zoom out and the present invention determines how changes affect other clocks in the same or other modules and/or the same clock in other modules.

13 Claims, 12 Drawing Sheets

Clock Specifications
| Index | Clock Name | Clock Mode | Frequency | Frequency Divider | Alternate Clk | Osc Source Type | Osc Source Name | Osc Source Frequency | Reset Source Name |
|---|---|---|---|---|---|---|---|---|---|
| 1 | clk_1 | Nominal | 100.0 | 1 | | PLL | PLL_0 | 100.0 | Bump_02... |
FIG._1
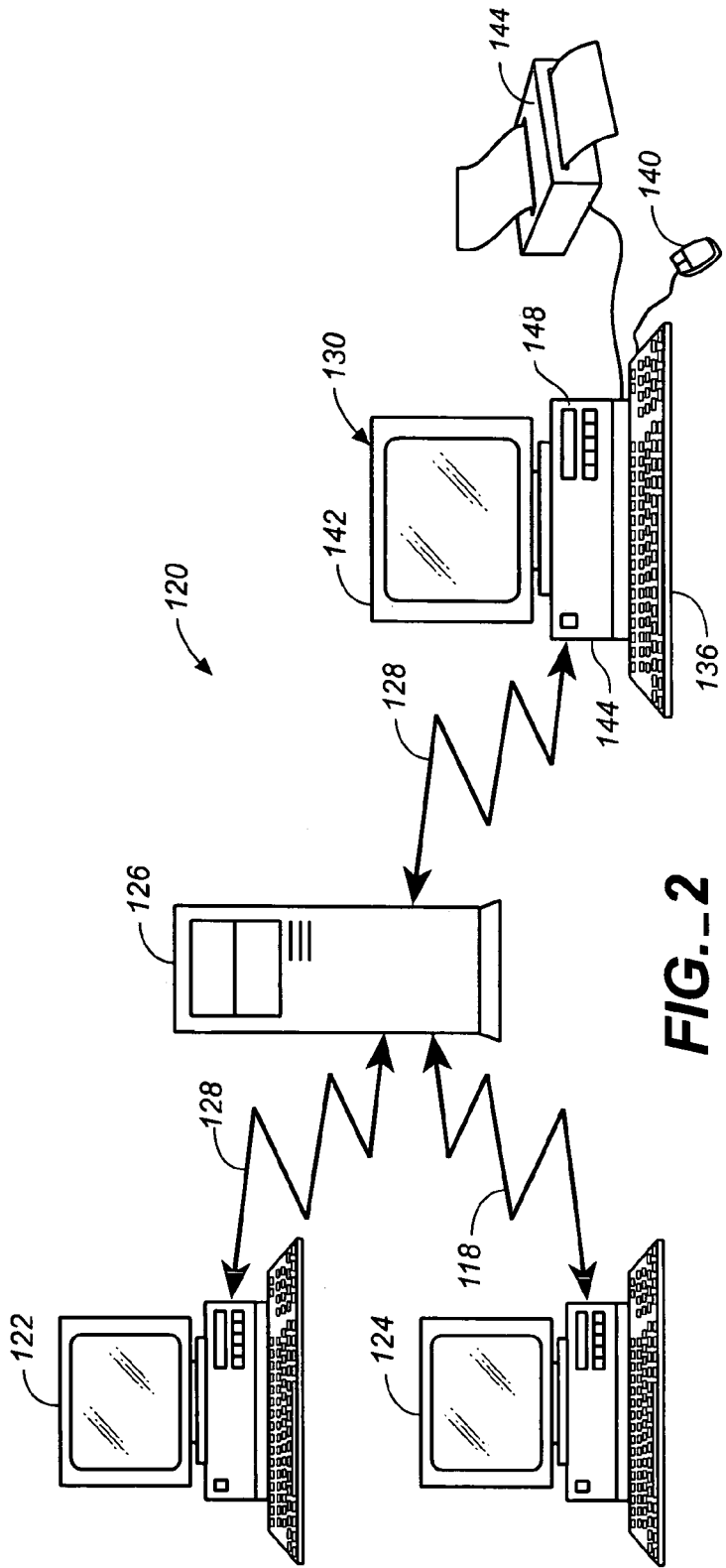
FIG._2

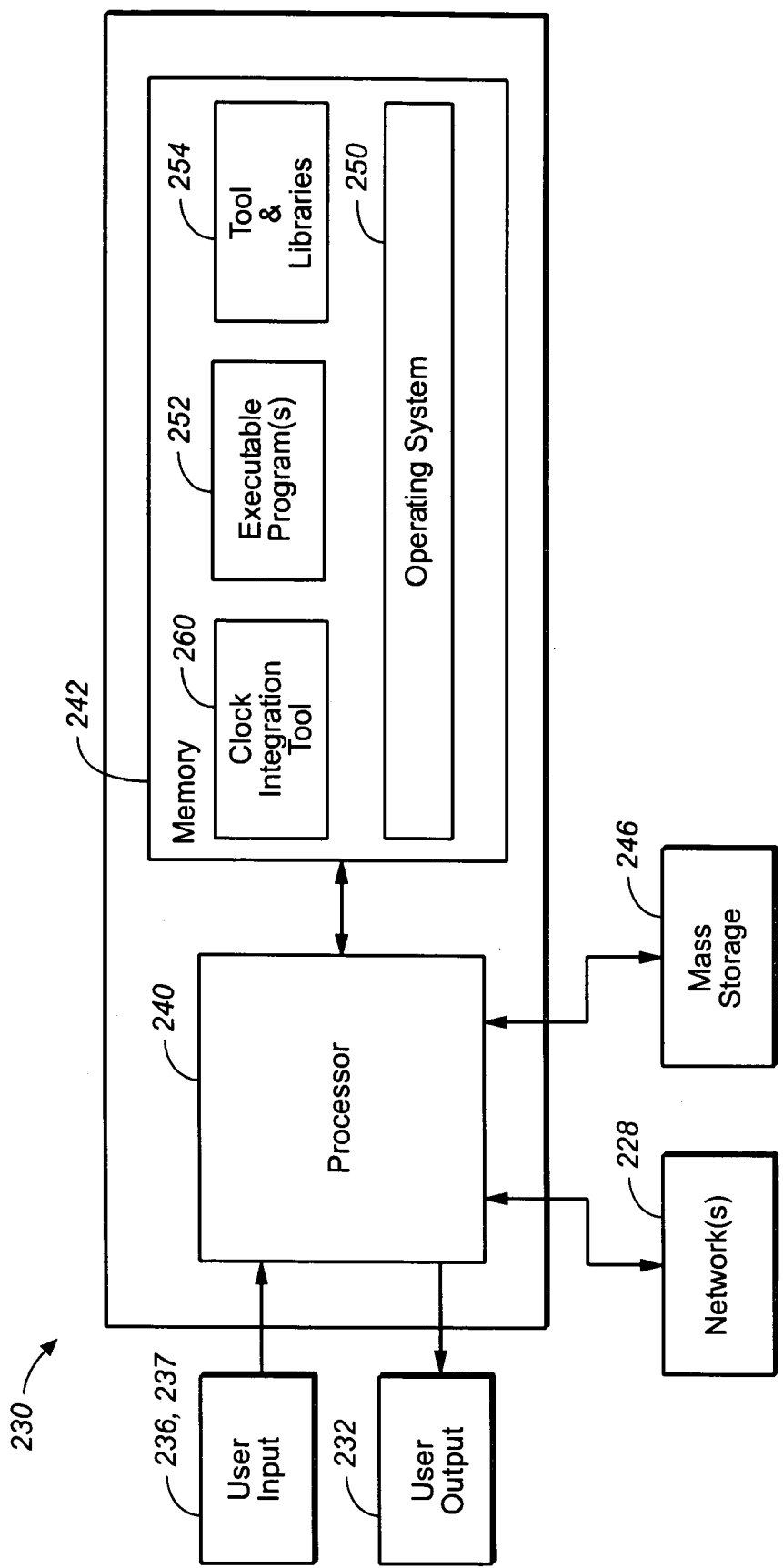
FIG._3

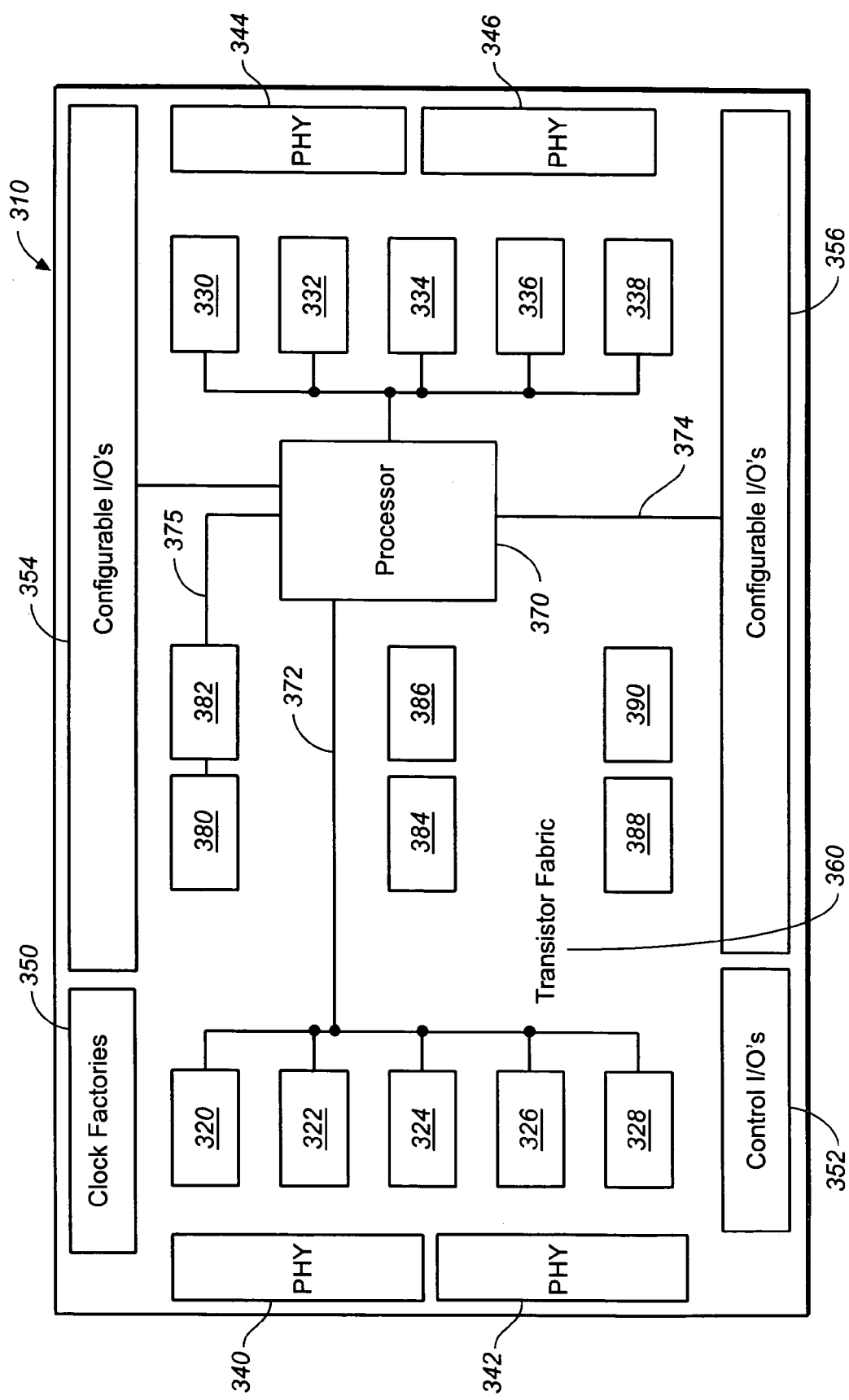
FIG._4

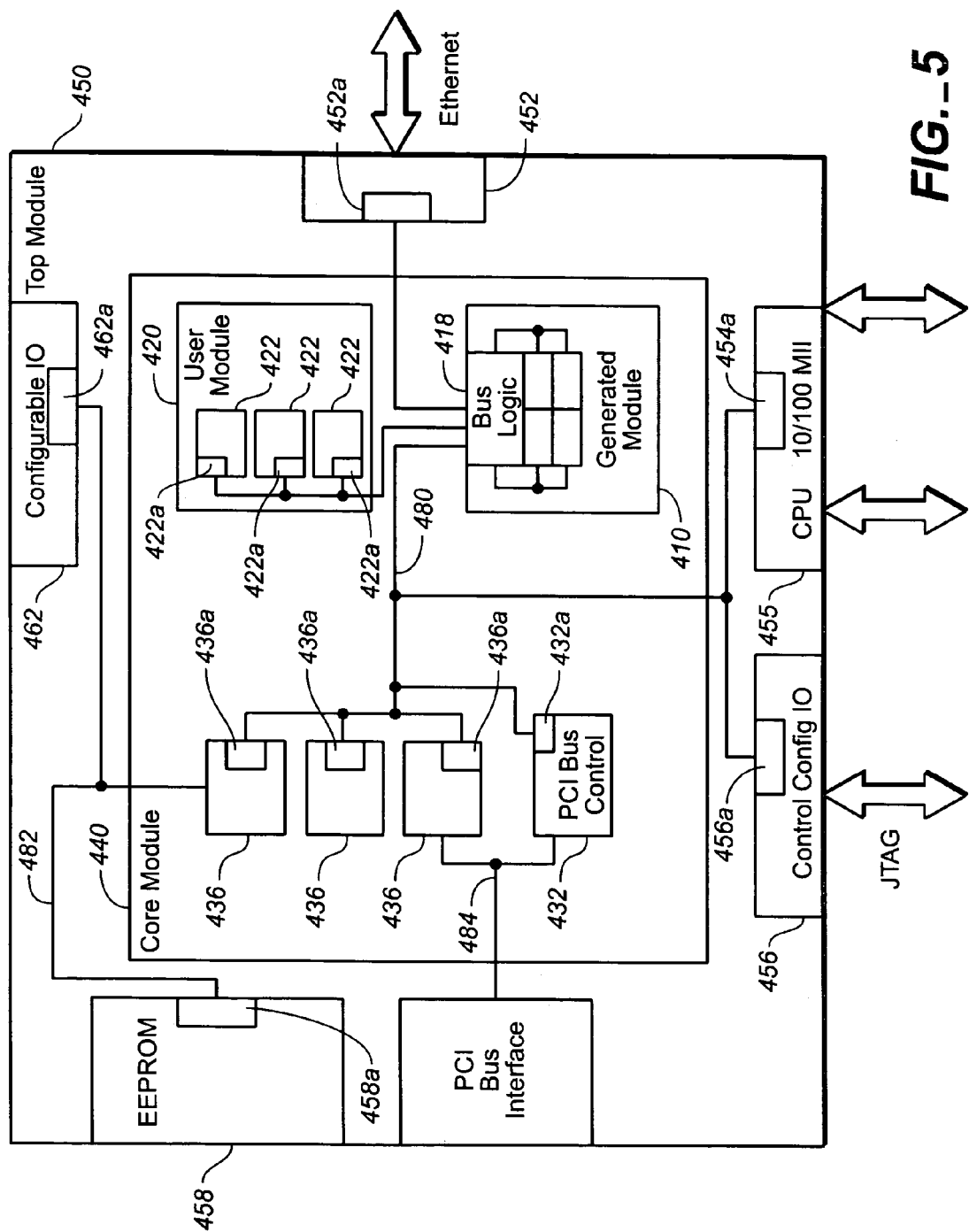
FIG._5

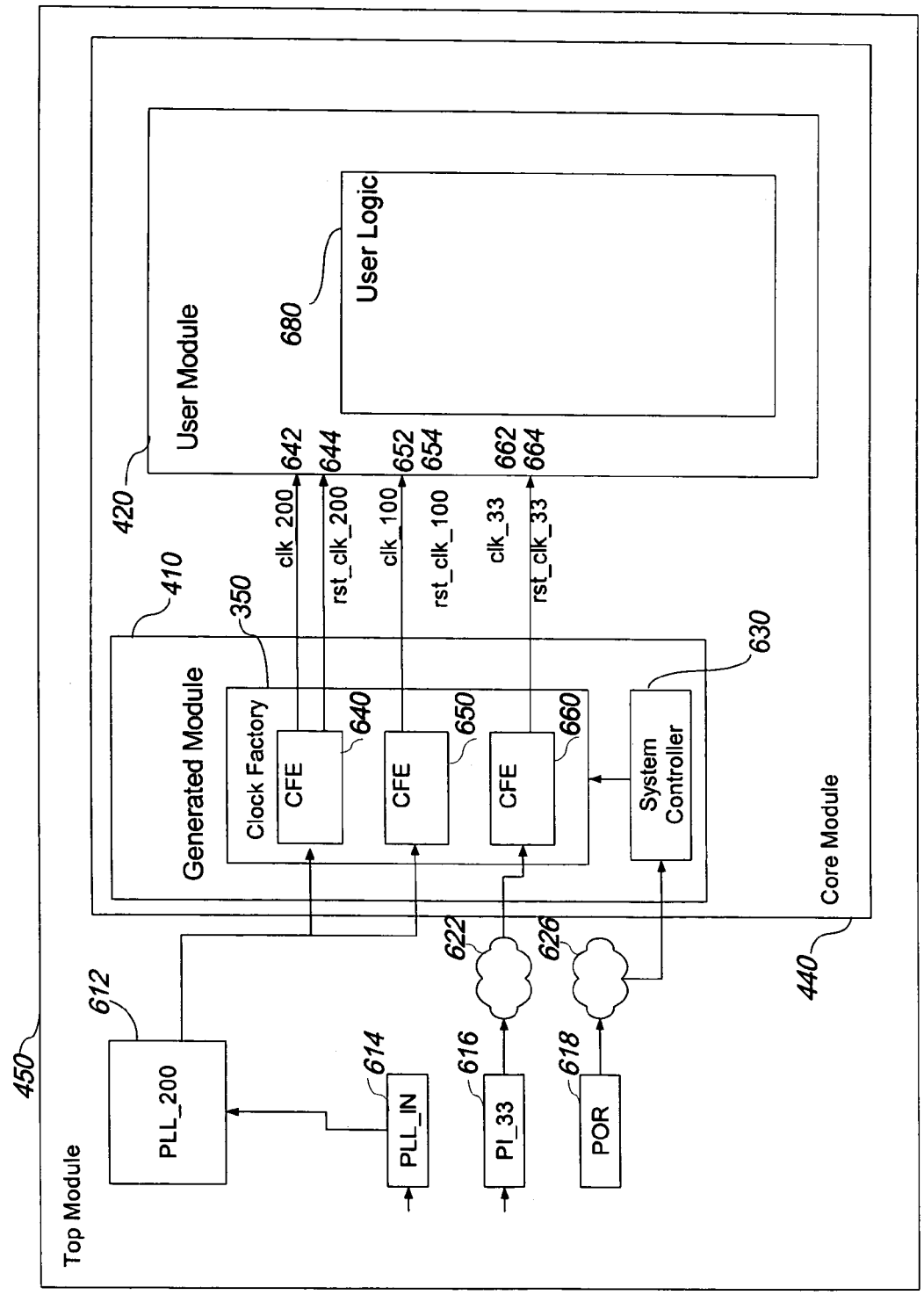
FIG._6

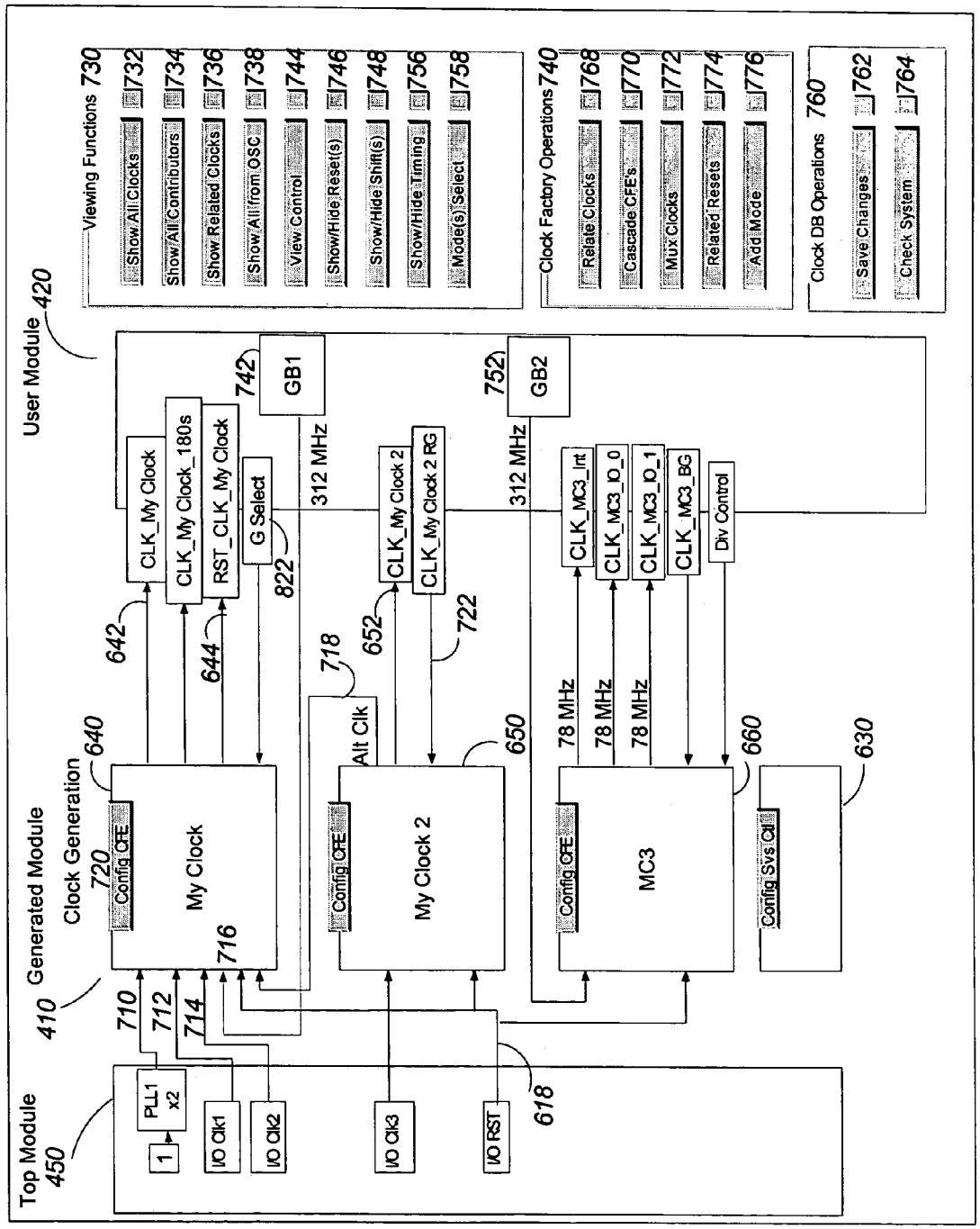
FIG._7

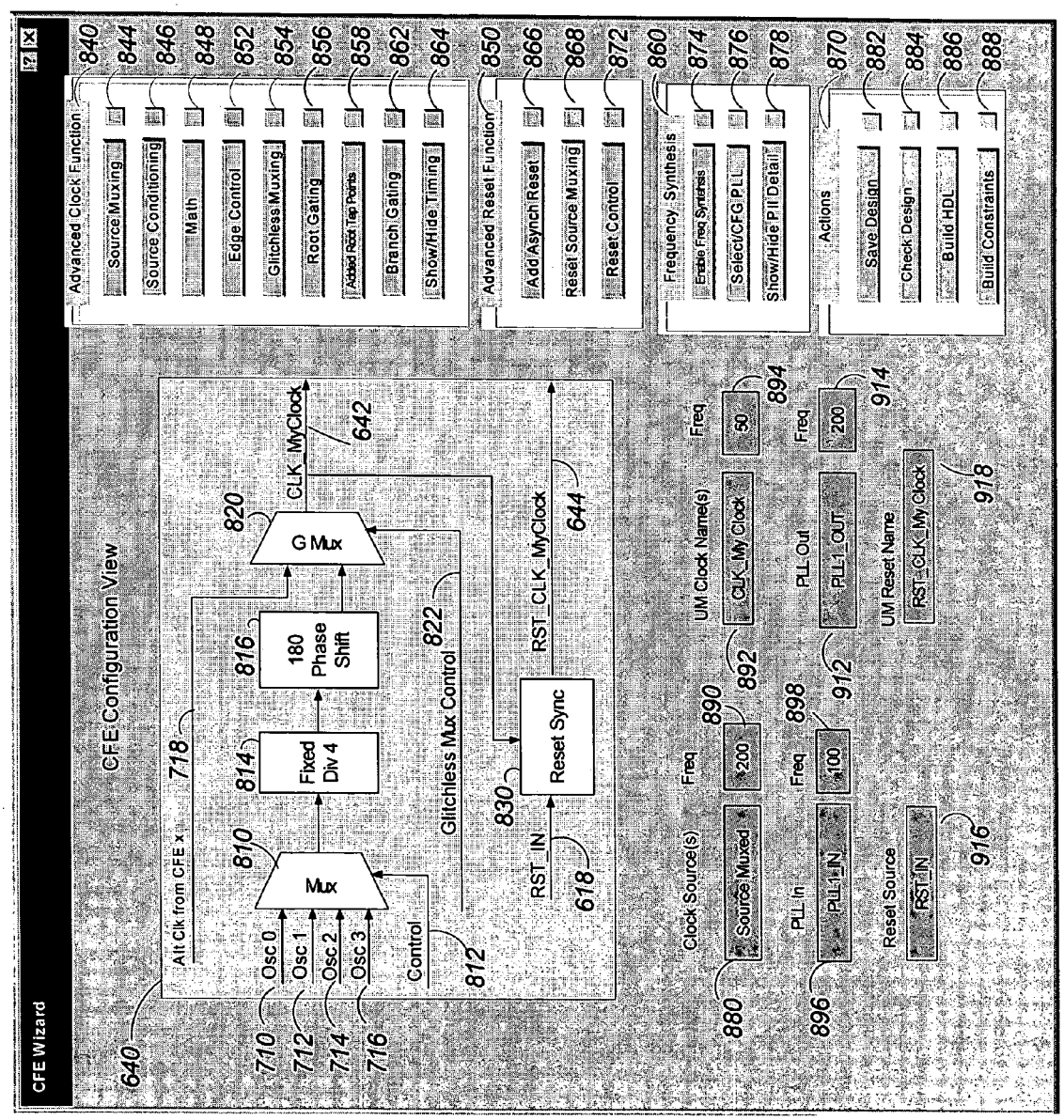
FIG._8

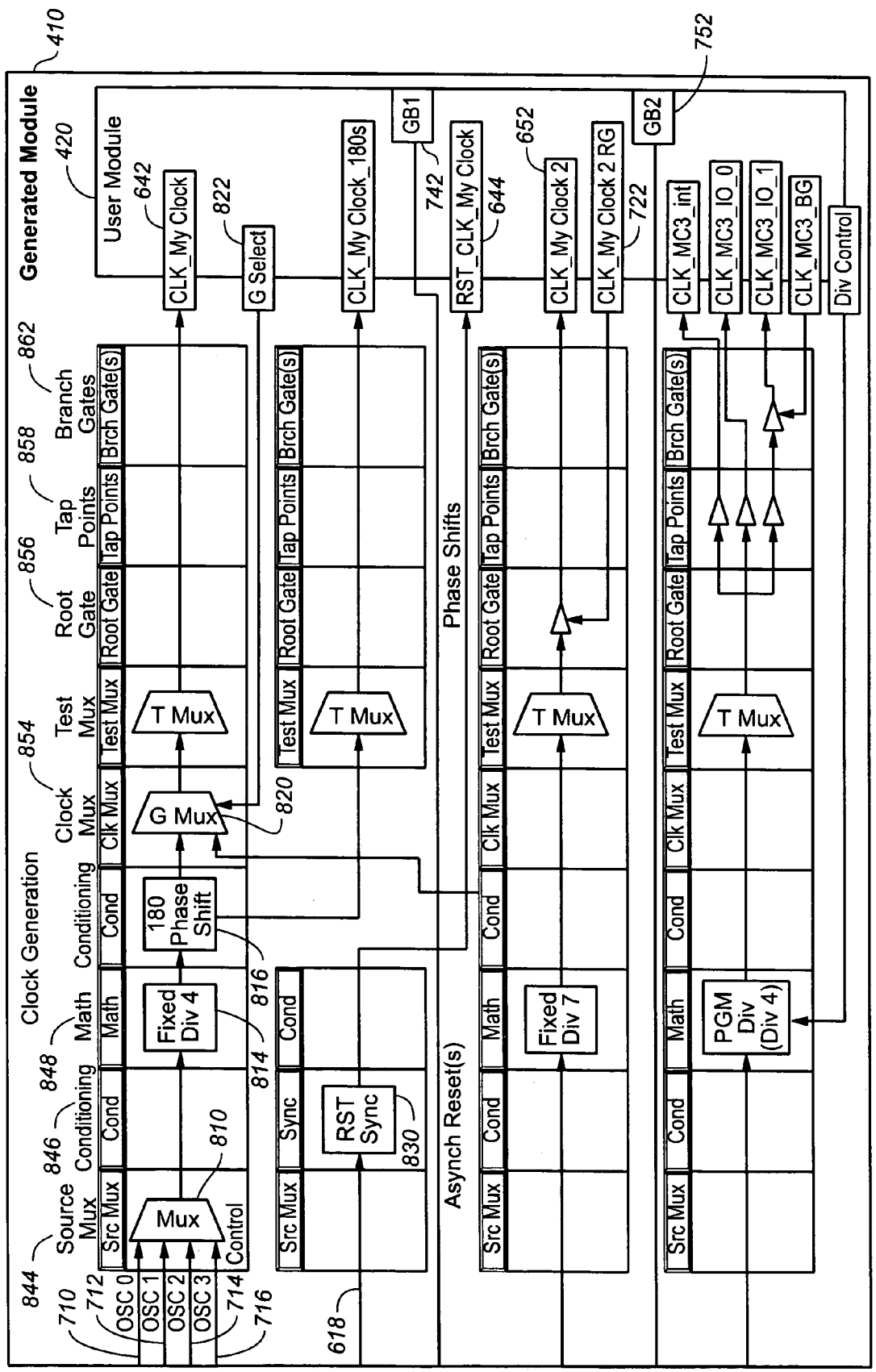
FIG._9

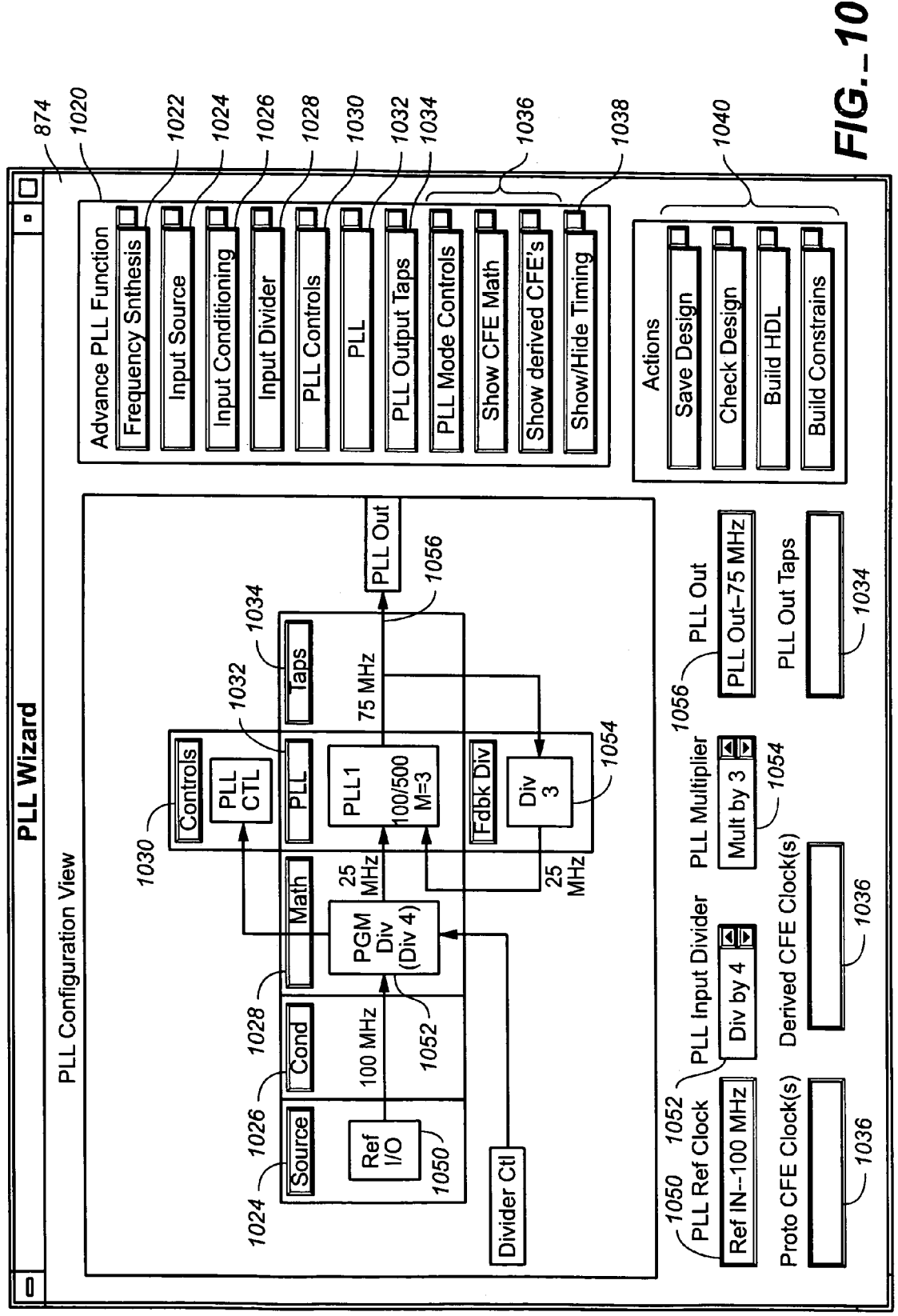
FIG._10

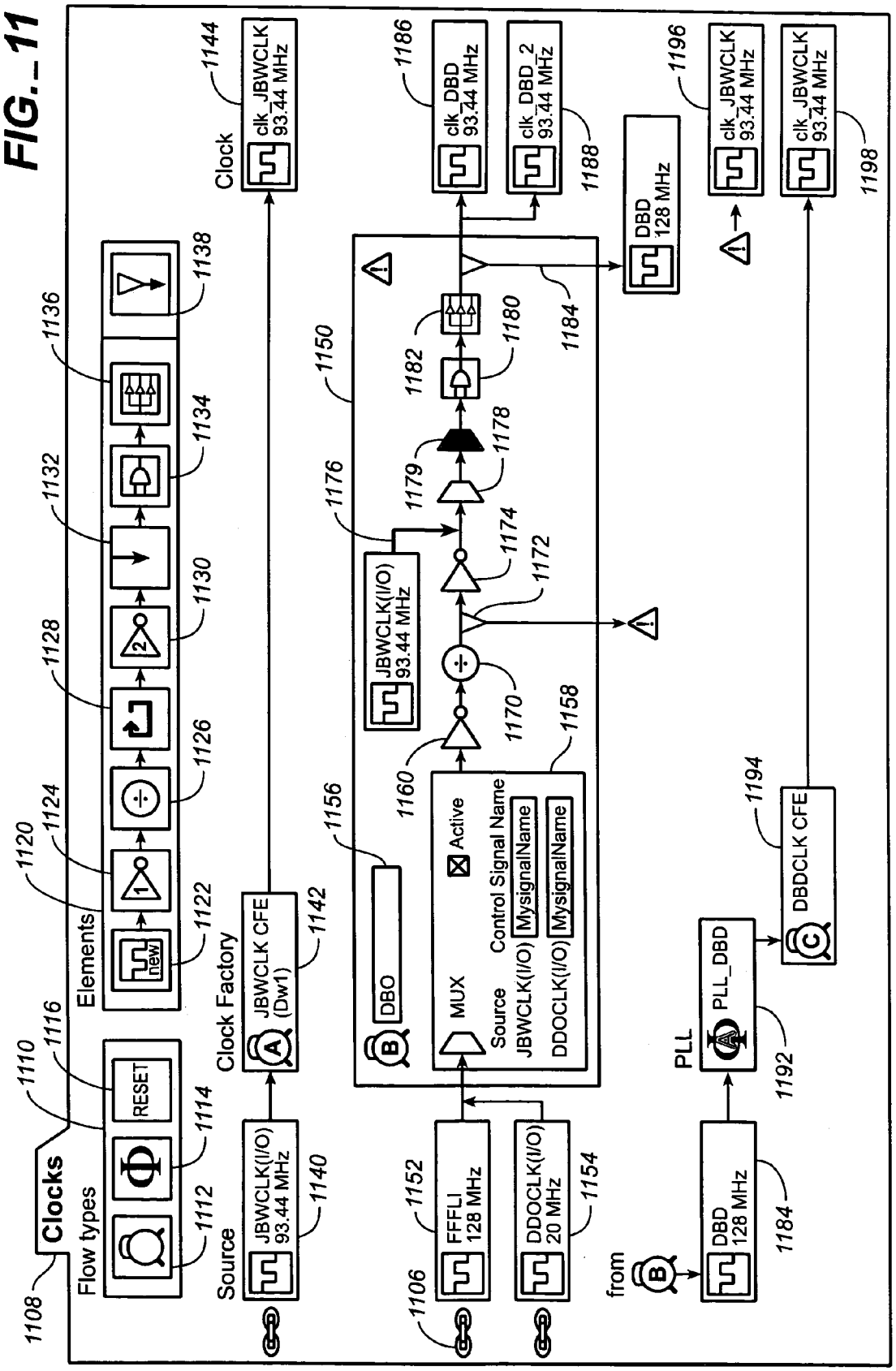

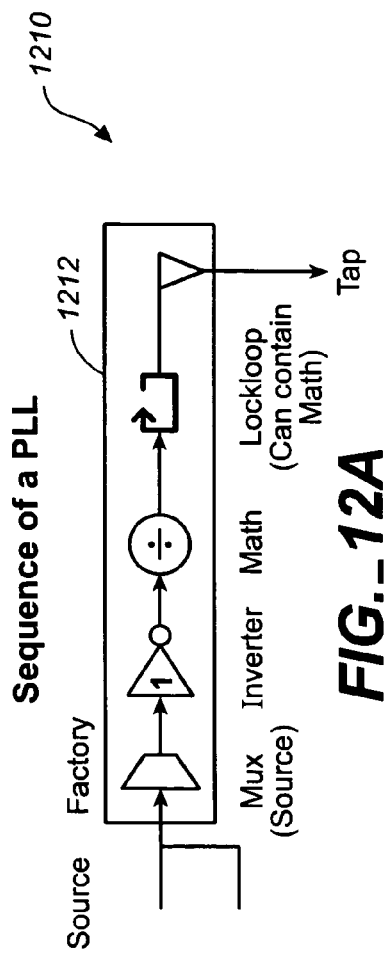
FIG._12A
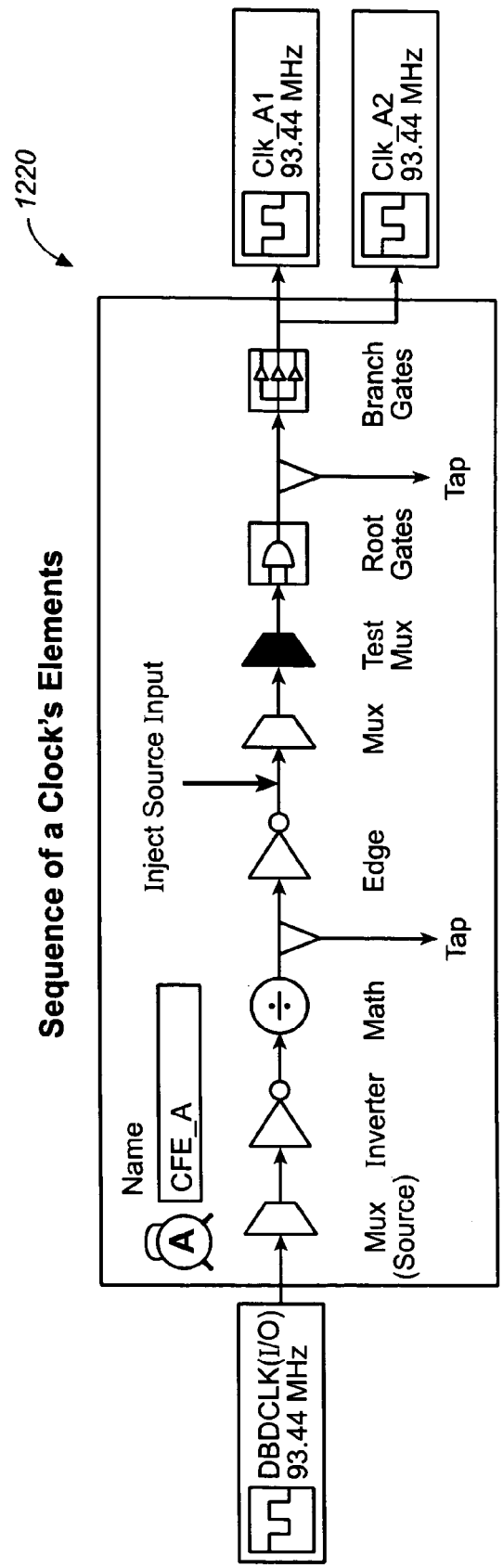
FIG._12B

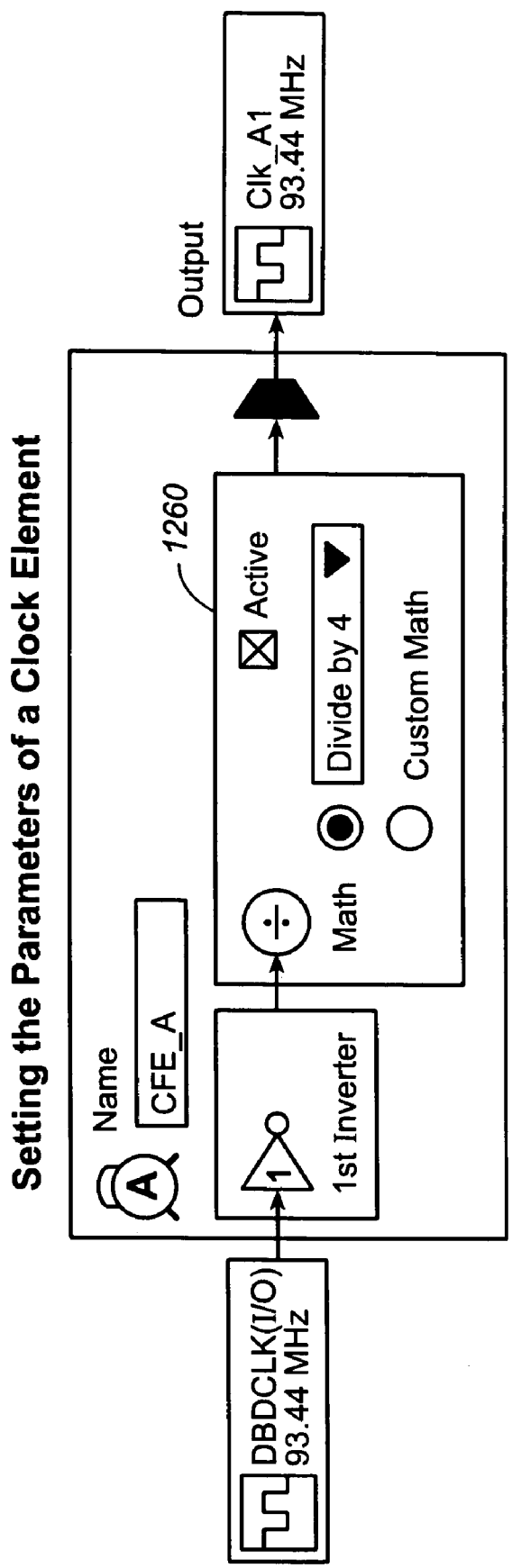
FIG._12C

GUIDED CAPTURE, CREATION, AND SEAMLESS INTEGRATION WITH SCALABLE COMPLEXITY OF A CLOCK SPECIFICATION INTO A DESIGN FLOW OF AN INTEGRATED CIRCUIT

RELATED APPLICATIONS

This application for an invention relates to U.S. Provisional Application Ser. No. 60/579,922 entitled RULES AND DIRECTIVES FOR VALIDATING CORRECT DATA USED IN THE DESIGN OF SEMICONDUCTOR PRODUCTS filed 15 Jun. 2004, and U.S. patent application Ser. No. 11/017,015, entitled RULES AND DIRECTIVES FOR VALIDATING CORRECT DA TA USED IN THE DESIGN OF SEMICONDUCTOR PRODUCTS, filed 20 Dec. 2004 (referred to herein as a component of the TOOLS); it also relates to U.S. patent application filed on 6 May 2004 Ser. No. 10/840,534 entitled ASSURING CORRECT DA TA ENTRY TO GENERATE VIEWS FOR A SEMICONDUCTOR PLATFORM (referred to herein as a component of the TOOLS); and to U.S. Provisional Application Ser. No. 60/577,356 filed 3 Jun. 2004 and U.S. patent application Ser. No. 11/017,017, entitled LANGUAGE AND TEMPLATE FOR USE IN THE DESIGN OF SEMICONDUCTOR PRODUCTS (referred to herein as a component of the TOOLS) filed 20 Dec. 2004, all applications owned by the same assignee as this application and all applications being incorporated by reference in their entireties.

FIELD OF THE INVENTION

This invention relates generally to the field of electronic circuit design and more particularly relates to a method, apparatus, and a computer program product by which clocks can be easily specified, generated, integrated and verified for a design flow of a semiconductor product.

BACKGROUND

An integrated circuit comprises layers of a semiconductor, usually silicon, with specific areas and specific layers having different concentrations of electron and hole carriers and/or insulators. The electrical conductivity of the layers and of the distinct areas within the layers are determined by the concentration of dopants within the area. In turn, these distinct areas interact with one another to form transistors, diodes, and other electronic devices. These specific transistors and other devices may interact with each other by field interactions or by direct electrical interconnections. Openings or windows are created for these electrical interconnections between the layers by a combination of masking, layering, and etching additional materials on top of the wafers. These electrical interconnections may be within the semiconductor or may lie above the semiconductor areas and layers using a complex mesh of conductive layers, usually metal such as platinum, gold, aluminum, tungsten, or copper, fabricated by deposition on the surface and selective removal, leaving the electrical interconnections. Insulative layers, e.g., silicon dioxide, may separate any of these semiconductor or connectivity layers. Depending upon the interconnection topology, transistors perform Boolean logic functions like AND, OR, NOT, NOR and are referred to as gates.

Several types of integrated circuits have been developed that take advantage of a modular approach having areas in which the transistors and their respective functions are fixed and other areas in which the transistors and their functions are totally or partially programmable/customizable. The different proportion of fixed to programmable modules in an integrated circuit is limited by factors such as complexity, cost, time, and design constraints. The field programmable gate array (FPGA) refers to a type of logic chip that can be reprogrammed. Because of the programmable features, FPGAs are flexible and modification is almost trivial but, on the other hand, FPGAs are very expensive and have the largest die size. The relative disadvantage of FPGAs, however, is its high cost per function, low speed, and high power consumption. FPGAs are used primarily for prototyping integrated circuit designs but once the design is set, faster hard-wired chips are produced. Programmable gate arrays (PGAs) are also flexible in the number of possible applications that can be achieved but are not quite as flexible as the FPGAs and are more time-consuming to modify and test. An application specific integrated circuit (ASIC) is another type of chip designed for a particular application. ASICs are efficient in use of power compared to FPGAs and are quite inexpensive to manufacture at high volumes. ASICs, however, are very complex to design and prototype because of their speed and quality. Application Specific Standard Products (ASSPs) are hard-wired chips that meet a specific need but this customization is both time-consuming and costly. An example of an ASSP might be a microprocessor in a heart pacemaker.

A digital system can be represented at different levels of abstraction to manage the description and design of complex systems with millions of logic gates, etc. For instance, a circuit diagram or a schematic of interconnected logic gates is a structural representation; a picture of a chip with pins extending from the black box/rectangle is a physical representation; and the architectural representation, considered the highest level of abstraction, describes a system in terms of what it does, how it behaves, and specifies the relationship between the input and output signals. An architectural description could be a list of functional units or operations and the nature of their interactions. Typical architectural representations may include such things as: (1) the performance characteristics of an interface, latency of access, or throughput; (2) protocols that form the mechanisms to facilitate the interactions, e.g., PCI bus to connect to external components or an AHB bus for interconnections on the chip, or custom interfaces, as required; (3) a listing of functions and possible mechanisms for implementation, such as a microprocessor block or memory controller, etc. Other abstract descriptions could be a Boolean expression or the data register transfer level logic (RTL). RTL descriptions are specified by the following three components: (1) the set of registers in the system or subsystem, such as a digital module; (2) the operations that are performed on the data stored in the registers; and (3) the control that supervises the sequence of the operations in the system.

Specialized electronic design automation (EDA) software, referred to as tools, intended to implement a more efficient process to design chips has been introduced. Integrated circuits are now designed with the EDA tools using hardware description languages, typically Verilog or VHDL. VHDL stands for VHSIC (Very High Speed Integrated Circuits) Hardware Description Language, the development of which was sponsored by the U.S. Department of Defense and the IEEE in the mid 1980s. VHDL and Verilog are only two hardware description languages but seem to have become the industry's standard languages to describe and simulate complex digital systems and incorporate timing specifications and gate delays, as well as describe the integrated circuit as a system of interconnected components. Execution of programs in hardware description languages are inherently parallel meaning that as soon as a new input arrives the commands corresponding to logic gates are executed in parallel. In this fashion, a VHDL or Verilog program mimics the behavior of a physical, usually digital, system.

In spite of the implementation of EDA tools, chip designers and testers still manually define the specification for clocks and the specification and address mapping for individual registers and internal memory, as well as separately and manually specify the implementation at the RTL, the verification testcases, and the firmware header file. Maintaining consistency and manually editing the multitude of minute modifications often required by this out-dated and tedious approach is very difficult and conducive to many mistakes. Inserting clocks during the design of semiconductor chips is still approached in an ad hoc fashion with little regard to other key aspects of the design system. Clock specifications that embody the capabilities of a design system are more complex than the component and chip architect and RTL logic designer are aware; thus creating a clocking "specification" via RTL gates and timing constraints is a poor means of specification that does not account for the bounds of physical realization given a particular design flow. A logical design specification does not encompass all the physical design specifications, and the indirect specification process often used requires reverse engineering to gauge and check the original design intent often too late in the design process. Often neglected in the design of clocking systems are the actual design tools and processes that realize the specification. These neglected but key aspects result in an incomplete specification for the entire integrated circuit and significant redesign is often required to create logic that can be clocked within the bounds of the design flow. Sometimes, the actual clocking circuits must be significantly altered to allow effective physical realization; the original intent may not be able to be correctly reversed-engineered and, therefore, may actually be implemented incorrectly. Clock specifications for an entire semiconductor product or integrated circuit may be displayed in tabular form such as shown in FIG. 1 wherein parameters of the clock might be headings of columns and instances of a clock signal might be the rows. Typically there may be tens or hundreds of clocks per integrated circuit so a tabular view may have hundreds of rows with numerous columns. Changing a value of a clock parameter in one column might affect the value of a parameter in another column or may even be disallowed, let alone critically impact other components or functions not included in the clocking specification. In addition, different perspectives or views with which a user might be concerned, so the tabular format of clock specifications used today typically contains superfluous and irrelevant information when addressing a particular aspect or problem of integrating clocks in a semiconductor product. For example, when correcting for phase, timing, and relationships among two clock signals, it is distracting to have to weed through the myriad of other clocks, and other clocking parameters not affecting the phase, timing, and relationships of two particular clock signals. In any case, a chip designer or clock integrator is typically unaware of the change or the factors influencing or influenced by a modification she/me makes until much further along in the design process, such as simulation and/or testing, or maybe not detected even until manufacture of the chip at the waste of hundreds of thousands of dollars if a critical clock does not work as expected.

There is thus a need in the industry to provide a user with tools and interfaces that intelligently guide a user in the specification, creation, and integration of clocks into a semiconductor platform or a semiconductor ASIC in the context of the entire or limited views of the design flow.

SUMMARY OF THE INVENTION

To satisfy this needs presented above, the inventors offer a method, a tool, and a program product to integrate clocks during the design of semiconductor products. The method comprises the steps of: reading an application set comprising a platform and a description of the platform; reading a customer's specification for an intended semiconductor product; visually displaying a plurality of views/perspectives of a clocking structure of the application set; for each of the views/perspectives, visually displaying and offering user interfaces to guide a user in the selection of parameters of the clock within the context of the view/perspective; and integrating the selected parameters, the customer's specification, and the application set into a design flow. In offering a designer only a contextual view/perspective and validating parameters entered by the designer, the method and the tool and program product create a design flow for the semiconductor product whose clocking and timing is correct-by-construction. The method, tool, and program displays and offers a designer only those parameters can be correctly realized by the specific design flow or a subset of that design flow.

The contextual views/perspectives may be selected from the group comprising: a hierarchical view; an architectural view; a circuit diagram view; a timing view; a mode view; a cost view; a printing view; a power consumption view; a documentation view; and/or a tabular view wherein features of the above views may be combined and are displayed in each of the plurality of views/perspectives as it pertains to a context in a module and/or component. For example, one of the plurality of views/perspectives may comprise a hierarchical view illustrating an origination of a plurality of clocks and a throughput of each of the plurality of clocks through each of a plurality of logical modules in a semiconductor platform to be designed into a semiconductor product. Using the method and the tool and/or the program/product, a user is able to acquire scalable detail acquired pertaining to one or more of the following parameters: number of clocks, a path of the clocks, related clocks, the source of clocks from one or more oscillators, reset clocks, timing, phase.

Another of the views/perspectives may comprise a display and offer the user a sequence of a plurality of elements comprising a clock factory, or a phase locked loop; one or more of the plurality of elements selected from the group comprising: a source multiplexer, a signal conditioner, a math function, an edge controller, a glitchless multiplexer, a root gate, a branch gate, timing, a reset, a test multiplexer, an inverter, a signal source input.

The tool, method, and program product may further restrict or hide clocking parameters not affecting nor affected by the user choices.

The invention may further be considered a tool for the design of semiconductor products, comprising: a reader to acquire a clocking specification of an application set to be developed into a semiconductor product; a customer's specification for the semiconductor product; a configurer to render the clocking specification into a plurality of scalable contextual perspectives, each of the scalable contextual perspective displaying portions of the clocking specification and the customer's specification relevant to its perspective; and a user interface within at least one scalable contextual perspective to guide a user to select at least one correct clocking parameter to integrate the customer's specification with the clocking specification of the application set.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE DRAWINGS

FIG. 1 is a simplified table specifying a clock.

FIG. 2 is block diagram of a networked computer system in which the clock specification, creation, and integration tool of the invention can be implemented.

FIG. 3 is a simplified block diagram of the functional components within a computer workstation to which an integrated circuit developer may access and use the clock specification, creation, and integration tool in accordance with an embodiment of the invention.

FIG. 4 is a simplified block diagram of a semiconductor platform having a number of components, each of which will probably have to be considered in terms of clocking, the clocks created and integrated according to an embodiment of the invention.

FIG. 5 is a simplified diagram illustrating the hierarchy of register transfer level logic of a semiconductor platform description usable by the clock specification, creation and integration tool in accordance with its features.

FIG. 6 is a simplified contextual version of FIG. 5 illustrating more detail of clocking detail in accordance with the scalable features of the invention.

FIG. 7 is an expanded logical view of the clocking elements shown in the generated module of FIG. 6 in accordance with principles of the invention.

FIG. 8 is an expanded structural view of a clock factory element configuration view of an architectural block of FIG. 7 illustrating features of the invention.

FIG. 9 is an expanded complex view of clock generation and integration for features shown in FIG. 8 used in accordance with an embodiment of the invention.

FIG. 10 is an expanded structural view that relates to the guided specification of a PLL and circuits used in conjunction with the PLL illustrating features of the invention.

FIG. 11 is a logical view of various clocking elements shown to represent the contextual and scalable features of the invention.

FIGS. 12a-12c illustrate the structured sequence of the configuration of various clocking elements in accordance with the contextual and scalable features of the invention.

DESCRIPTION OF THE INVENTION

The present invention now will be more fully described with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough, complete, and will fully convey the scope of the invention to those skilled in the art. Like numbers may refer to like elements and process steps throughout.

Referring to FIG. 2, which illustrates an exemplary computer system 120 upon which a tool to validate the correctness and use of data during the design of a semiconductor product as disclosed herein, could be installed and/or used. Computer system 120 is illustrated as a networked computer system that includes one or more client computers 122, 124 and 130 such as workstations coupled through a network 128 to a server 126. Server 126 could also be a personal computer, a workstation, a midrange computer, or a mainframe computer. While shown here as a point-to-point connection, computers 122 and 124 need not be coupled to server 126 directly, but may be coupled to yet another network which in turn is connected to server 126. Network 128 represents any type of networked interconnection including but not limited to local-area, wide-area, wireless, and public networks such as the Internet or an Intranet, and any number of routers and hubs connected in between, e.g., a local-area network to a wide-area network to the Internet through a series of routers and/or other servers. Any number of computers and other devices may be networked through network 128, e.g., multiple servers, hand-held devices, etc.

For the purposes of the invention, computer 130 may represent practically any type of computer, computer system, or other programmable electronic device, including a client computer similar to computers 122, 124 of FIG. 2, a server computer, e.g., similar to server 126 of FIG. 2, a portable computer, an embedded controller, a hand-held device, etc. Computer 130 may be coupled in a network 128 as shown in FIG. 2 or may be a stand-alone device. Computer 130 will hereinafter also be referred to as a computer although it should be appreciated that the term "computer" may also include other suitable programmable electronic devices capable of allowing a chip designer to use the CLOCK SPECIFICATION, CREATION, AND INTEGRATION TOOL described herein.

With reference to FIG. 3 wherein the method and apparatus of correctly specifying, creating, and integrating clocks throughout the design process or flow for a semiconductor product as disclosed herein is installed as an application on computer 230. Computer 230 typically receives a number of inputs and outputs for communicating information externally. For interface with a user or operator, computer 230 typically includes one or more user input devices 236, 237, e.g., a keyboard 136 and/or mouse 140 of FIG. 2, a trackball, a joystick, a touchpad, and/or a microphone, among others, and one or more output devices 232 such as a display 142 and/or a printer 144 of FIG. 2, a speaker, among others. Some servers, however, do not support direct user input and output. For additional storage, computer 230 may also include one or more storage devices 148 of FIG. 2, e.g., a floppy or other removable disk drive, a hard disk drive, a direct access storage device, an optical drive, e.g., a CD drive, a DVD drive, etc., and/or a tape drive, among others, that may be connected directly or other storage 246 that may be connected through a storage area network (SAN) or other network 228. Furthermore, computer 230 may include an interface connected to one or more networks 228, e.g., a local-area network, a wide-area network, a wireless network, and/or the Internet, among others, to permit communication of information with other computers 122, 124 coupled to the network 128. It should be appreciated that computer 230 typically includes suitable analog or digital interfaces between processor 240 and each of the components as is known in the art.

Computer 230 typically includes at least one processor 240 coupled to a memory 242. Processor 240 may represent one or more processors or microprocessors and memory 242 may represent the random access memory (RAM) devices comprising the main storage of computer 230, as well as any supplemental levels of memory such as cache memories, nonvolatile or backup memories, programmable or flash memories, read-only memories, etc. In addition, memory 242 may be considered to include memory storage physically located elsewhere in computer 230, e.g., any storage capacity used as a virtual memory, e.g., as stored on a mass storage device 246 coupled to computer 230 with a SAN or on another computer coupled to computer 230 via network 228. Computer 230 may operate under the control of an operating system 250 such as a UNIX-based, LINUX-based, or WINDOWS-based operating system, as is known in the art, but is not so limited by the particular operating system, or indeed need not be under the control of any operating system. Operating system 250 typically executes various computer software applications, components, programs, objects, modules, etc., such as an executable program 252, etc. Although the tools and libraries 254 for developing an integrated circuit may be in memory 242, they need not be. The processor 240 may access the tools and libraries 254, the required data, other various applications components, programs, objects, modules, etc., resident on one or more processors in another computer coupled to computer 230 via a network 228, e.g., in a distributed or client-server computing environment whereby the processing to implement the functions of the correct view generation tool may be allocated to multiple computers over a network. One of the applications may include the CLOCK SPECIFICATION, CREATION, AND INTEGRATION TOOL that could be interactive with the operating system 250, the tools and libraries 254, other executable programs 252 and the user.

In general, the program or method steps which cause a computer to capture the specification of, create and integrate the minimal and correct clocking parameters during the design of a semiconductor product, whether implemented as part of an operating system or a specific application, component, program, object, module, or sequence of instructions, is referred to herein as the CLOCK SPECIFICATION, CREATION, AND INTEGRATION TOOL. The CLOCK SPECIFICATION, CREATION, AND INTEGRATION TOOL typically comprises one or more instructions that are resident at various times in various memory and storage devices in a computer, and that, when read and executed by one or more processors in a computer network, cause that computer to perform the steps necessary to execute steps or elements embodying the various aspects of the invention. While the invention has and hereinafter will be described in the context of fully functioning computers and computer systems, those skilled in the art will appreciate that the various embodiments of the invention are capable of being distributed as a program product in a variety of forms and that the invention applies equally regardless of the particular type of signal bearing media used to actually carry out the distribution. Computer program code for carrying out operations of the present invention may execute entirely on the user's computer, partly on the user's computer, as a stand-alone software package, partly on the user's computer and partly on a remote computer or entirely on the remote computer. In the latter scenario, the remote computer may be connected to the user's computer through a network 128, for example, the Internet using an Internet Service Provider. Examples of signal bearing media include but are not limited to recordable type media such as volatile and nonvolatile memory devices, floppy and other removable disks, hard disk drives, optical disks, e.g., CD-ROMs, DVDs, etc., among others, and transmission type media such as digital and analog communication links.

One input to the CLOCK SPECIFICATION, CREATION, AND INTEGRATION TOOL is the application set. An application set is, inter alia, a description of the physical and logic resources of a partially manufactured semiconductor platform and several views that make the platform useful to a chip designer. Viewing FIG. 4, a semiconductor platform 310 is a partially manufactured semiconductor device in which the wafer layers up to the connectivity layers have been fabricated. The platform 310 comprises a base semiconductor wafer from, e.g., silicon, silicon-on-insulator, silicon germanium, gallium arsenide, other Type II, IIII, IV, and V semiconductors, etc. and is a piece of semiconductor material into which blocks or hardmacs have been diffused into the semiconductor layers. Diffusing a semiconductor wafer to create a hardmac simply means that during fabrication of the wafer layers, transistors or other electronic devices have been particularly arranged in the wafer layers to achieve specific functions, such as diffused memory 320-328, 330-338, data transceiver hardware such as I/O PHYs 340-346, phase-locked loops (PLLs) that can be used in creating clock factory elements 350, control I/Os 352, configurable input/output (I/O) hardmacs 354, 356; each of the hardmacs have an optimum arrangement and density of transistors to realize its particular function. The platform further comprises an area of transistor fabric 360 for further development of the platform 310 using a suite of design tools, such as the TOOLS which may be part of the tools and libraries 254 of FIG. 3, one or more which may interact with the CLOCK SPECIFICATION, CREATION, AND INTEGRATION TOOL as described herein. Transistor fabric 360 is an array of prediffused transistors in a regular pattern that can be logically configured by the suite of design tools herein to achieve different functions. A cell refers to the personalization of the interconnect layers that instantiate the logic gates of the transistor fabric. A memory compiler (not shown) may have compiled some blocks of diffused memory 320-338 for specific sizes, timing requirements, connections, etc. The placement of these hardmacs, compiled memories, and the reserved areas of the transistor fabric 360 have been situated to achieve the desired timing and performance both within the platform and for the platform 310 to connect externally.

One of skill in the art will appreciate that the platform 310 shown in FIG. 4 is only one example of a platform and its components. Different platforms may contain different amounts and arrangements of transistor fabric, different amounts of diffused and/or compiled memories, both fixed and configurable I/O blocks, clocks, etc. depending upon the purpose of the final integrated chip. For instance, if the final chip is intended to be a communication and/or network integrated circuit, the periphery of the platform may contain many I/O hardmacs that have been fixed as PHYs and/or that can be configured differently from one another. Likewise, if the final integrated chip is intended to be a specialized microprocessor then it may not have as many I/O hardmacs or configurable I/O, and more or less diffused registers and memories. The point is that there are different platforms for different semiconductor products. The platform 310, moreover, optionally may include the contact mask and some of the fixed higher layers of connectivity for distribution of power, ground, and external signal I/O.

The platform definition is a detailed listing of the resources, features, and restrictions, if any, associated with the platform, such as the area and availability of transistor fabric, the I/O and memory available, the requirements of the hardmacs, the cost of the platform, the ideal performance that can be expected of the platform, the expected power consumption, and other functional requirements. For memory elements, the platform definition may include, inter alia, details of: (a) area and physical placement of the memory array and its interface/connection pins; (b) bit width and depth; (c) organization, e.g., numbers of read/write ports, bit masking; (d) cycle time; and (e) power estimates. For I/O elements, the platform definition may provide, inter alia, the types of I/O, the I/O drive strength, etc. For clock elements, the platform definition provides the frequencies at which the platform may operate, the duty cycle, etc. Other details of the platform definition may include the configuration of the transistor fabric and the diffused and compiled elements, the status of the logic, the required control signals and the features enabled by the control signals, whether any element undergoes testing, the location and the number of the elements on the platform, etc.

The platform definition is input to a suite of design tools to enable some functions and disable other functions as appropriate to the platform. Using the CLOCK SPECIFICATION, CREATION, AND INTEGRATION TOOL and a suite of design tools, a chip designer can integrate her/his customer's requirements with the platform's resources and definition to verify and synthesize designs generated by each tool, insert clocks, create the test interconnects, and then integrate the designs together to create a complete design flow. Thus, a flow may also be considered a collection of tools and processes to achieve the resultant semiconductor product. A correct design flow, moreover, can be a qualified netlist with appropriate placement and routing amongst the existing resources and for external connections to a board. To create a customized chip, all that is needed is a small set of remaining masks to create the interconnections between the preplaced elements.

There are a number of tools and views within those tools used by a designer to integrate her/his customer's requirements using a particular platform description, and depending upon the designer's particular task; one or more of these tools and views can be used in the design flow. While the following description is not limitative, it is nonetheless, fairly representative of the infrastructure necessary to use the platform and create a functional semiconductor product from the platform. These tools and views comprise: the RTL views, the documentation view, the verification view, the synthesis view, the static timing analysis view, the manufacturing test view, the floorplan view, and the RTL qualification view. The RTL view provides a logical description of the platform, and the generated or user resources. The documentation view may be considered the functional description of the resources. The verification view is the functional verification description, and the synthesis view may be thought of as the generation description. The static timing analysis view is the timing description, the manufacturing test view is the test description, and the floorplan view is a location description of the platform resources.

An additional perspective of these views may be obtained by abstracting the semiconductor product as modules based upon the source of the RTL and the function of the logic, such as shown in FIG. 5. One of skill in the art will understand that these views are not necessarily generated according to this or any other abstraction; that is to say, a generated verification view or any other view may have aspects in one or more of these modules and that the views are not necessarily generated in the order of or limited to the following modules. The information is presented to show the complexity and the interconnectedness of the views with each other and with the modules throughout the semiconductor platform. The generated module 410 preferably comprises the views generated by a suite of design tools for I/O, memory, clocks, or may be derived from other known semiconductor design tools such as described in copending United States patent applications, commonly owned by the assignee herein and hereby incorporated by reference in their entireties and referred to herein as the TOOLS: Ser. No. 10/435,168 filed 8 May 2003 entitled AUTOMATION OF THE DEVELOPMENT, TESTING, AND RELEASE OF A FLOW FRAMEWORK AND METHODOLOGY TO DESIGN INTEGRATED CIRCUITS, Ser. No. 10/318,792 filed 13 Dec. 2002 entitled FLEXIBLE TEMPLATE HAVING EMBEDDED GATE ARRAY AND COMPOSABLE MEMORY FOR INTEGRATED CIRCUITS, Ser. No. 10/318,623 filed 13 Dec. 2002 entitled AUTOMATED SELECTION AND PLACEMENT OF MEMORY DURING DESIGN OF AN INTEGRATED CIRCUIT; Ser. No. 10/334,568 filed 31 Dec. 2002 entitled PLACEMENT OF CONFIGURABLE INPUT/OUTPUT BUFFER STRUCTURES DURING DESIGN OF INTEGRATED CIRCUITS, Ser. No. 10/335,360 filed 31 Dec. 2002 entitled A SIMPLIFIED PROCESS TO DESIGN INTEGRATED CIRCUITS; Ser. No. 10/465,186 filed 19 Jun. 2003 entitled DESIGNING AND TESTING THE INTERCONNECTION OF ADDRESSABLE DEVICES OF INTEGRATED CIRCUITS; and Ser. No. 10/713,492 filed 14 Nov. 2003 entitled FLEXIBLE DESIGN FOR MEMORY USE IN INTEGRATED CIRCUITS. The generated module 410 may include some preplaced, timed, and proven components, such as one or more clock generators, system controllers and reset logic, test controllers, and/or analog serializers/deserializers (SERDES) hardmac components. The generated module 410 has connectivity requirements to the various modules and their components through bus logic 418 to the several modules along an internal bus 480 and/or external bus 482. Bus logic 418 may include arbiters, multiplexers, decoders, etc. to manage the connectivity and, if necessary, the address translation and register/memory coherence schemes.

Logic from the customer for whom the integrated circuit is designed comprises the user module 420 and may include prefabricated logic and hardware such as cores, hardmacs, firm or soft, IOs, registers 422, etc. Hardmacs are those components for a specific function whose connection and timing parameters have been fully specified. Firm modules are those in which the timing and connections within the modules have been specified but the connections outside the boundary of the module have yet to be specified and implemented. Soft modules are those in which only the register transfer logic (RTL) for a specific function has been set forth; the RTL still needs to be synthesized into the transistor fabric, but can be placed in the transistor fabric anywhere on the chip. Also included in the user module 420 may be a list of memories and/or registers having tie-offs, i.e., the memories and/or registers that will not be used for data flow and may thus be allocatable for performance enhancing features such as control status registers, etc. The user module 420 also provides input into the CLOCK SPECIFICATION, CREATION, AND INTEGRATION TOOL described herein.

The core module 440 is created with the application set and thus encompasses the resources and the views pertaining to these resources of the application set. The core module 440 and its accompanying views provide the template upon which the customer's requirements will be built and are input into the CLOCK SPECIFICATION, CREATION, AND INTEGRATION TOOL described herein. The core module 440 may be as simple as logic signals directly connected to external chip I/Os, or it may be more complex logic upon which the user module 420 and the generated module 410 can build. For example, views of the core module 440 could include the complete infrastructure to support a PCI bus controller 432, 432a including all the connections to external I/Os and/or a DDR/SRAM memory controller, a processor subsystem 436, 436a, etc. The TOOLS accept the views of the core module 440 and then further facilitates matching and binding the memories, register blocks, any cores 436 in the other modules to the top module 450, such as matching protocols and correctly binding the correct I/O hardmacs PHYs 452, such as an XGXS to support data transfer at Gigabit Ethernet speeds, or a MW SPI-4 core. The core module 440 further encompasses the user module 420 and provides correct and proven logic interfaces connecting the various modules with each other and with the top module 450.

The top module 450 contains the logic and supporting views for the hardmacs and configured logic towards the periphery of the platform for outside communication. The top module 450 thus contains the I/O blocks and I/O diffused areas and any registers associated with the hardmac and configurable I/Os. The instantiated I/O blocks that use the top module 450 may include the PLLs, the I/O netlists of which a NAND tree is a part, test logic, and lock detect circuits, etc. A number of input tables describing the interconnect templates are used by the TOOLS referenced in the patent applications above to integrate the bus masters of 452a 454a, 456a, 458a, 462a of their respective top module components 552, 554, 556, 558, 562 with the application set and the rest of the design. These top module components may include a JTAG TAP controller 456, an Ethernet interface 452, a CPU connection interface 454, and/or an EEPROM interface 458, etc., each of which may require special consideration when inputting associated parameters.

FIG. 6 illustrates a clock specific hierarchical view which is a clock enhanced subset of FIG. 5 illustrating some of the principles by which a clock specification can be represented in accordance with the principles of dynamic content-driven information of the CLOCK SPECIFICATION, CREATION, AND INTEGRATION TOOL. Dynamic content-driven information is a key feature of the invention and, simply stated, means that only the information required by a user to accomplish a particular task is seen by the user. Required information can be obtained by one or more of the following pervasive graphical user interface (GUI) features: editable drop-down lists that allow a user to select from the choices in the drop-down list or to add additional parameters in a display; drop-down lists; textfields, fly-over text; dialogs including customized XML dialogs, and/or control bus tables. Shown in FIG. 6 is a clocking hierarchical structure having a top module 450, a core module 440, a generated module 410, and a user module 420. As mentioned, the generated module 410 may contain system controller 630 and clock factories 350 having three clock factory elements 640, 650, and 660. The clock factory element 640 is the selected component that will be expanded according to dynamic content-driven information. Input into the clock factory element 640 is a signal PLL_200 derived from a phase-locked loop component 612 in the top module 450. In response, the clock factory element 640 generates two signals: signal clk_200 642 and reset signal rst_clk_200 644. A second clock factory element 650, also receiving input signal PLL_200 generates clock clk_100 652 and reset rst_clk_100 654. A third clock factory element 660 generates clock signal clk_33 and rst_clk_33 from input derived from PI_33 616. The output clock and reset signals from the three clock factory elements are available for use in the user module 420. Thus, the view of FIG. 6 provides a "big picture" or overview of a portion of the clocking specification without going into details of the clocks within the modules themselves.

Given that a user is interested in clock generation derived from the clock factory element 350, she/he can click on the clock factory element 350, using a hypertext, a flyover technique or other known techniques, to access more detailed information about clock generation. In doing so, a user interface such as shown in FIG. 7 may appear that further displays context-driven information about the nature of clocking in the generated module 410. In the view of FIG. 7, clock factory element 640 has a name MyClock in the generated module 410, clock factory element 640 has a name MyClock2, and clock factory element 650 has the name MC3. The output and input signals of each clock factory element are shown in more detail with more specific names, e.g., signal clk_200 642 is CLK_MyClock and rst_clk_200 644 is RST_CLK_MyClock. Additional signal input from the user module 420 is also provided to My Clock 640 from GB1 742 and to MC3 660 from GB2 752.

At the right side of the FIG. 7 is a list of viewing functions 730 which allow a user to manage the complexity associated with clocking in an integrated circuit and keep focus on important parameters associated with a clock factory element or another component shown. These functions include showing all clocks 732, showing all contributors to the clocks 734, showing all the related clocks 736, showing all output signals from the oscillators 638, viewing the clock control signals 744, show or hide the reset signals 746, show or hide the phase-shifted clocks 748, show or hide the timing of the clocks 756 and/or selecting a mode 758. The timing of the clocks are shown as by the frequency given the signals, e.g., output from the top module 450 is a signal at 200 MHz, one signal at 50 MHz, another signal at 25 MHz. The signals output from MyClock 640 have a frequency or timing of 50 MHz; output from MyClock2 650 is a signal at 20 MHz. When a frequency is known, that timing will be shown or hid by clicking on Show/Hide Timing 756. Selecting a mode 758 means being able to view the design flow once certain options, such as multiplexed signals, are selected. Selection of different signals at different inputs and outputs yields different views and a user can verify that all permutations of the multiplexed signals yield correct-by-construction circuitry and timing. Of course, more or fewer functions that are pertinent to the user and to clock generation and integration can be shown. Other examples of views (not shown) include a cost view, that is, given certain options or requirements, a chip designer can establish a whether the cost associated with the option is prohibitive or within reason; a power consumption view of the joule losses, a printing view which can be especially useful when viewing different modes, and a tabular view. The clock factory operations 740 available to a user include relating clocks 768, cascading the clock factory elements 770, multiplexing clocks 772, relating reset clocks 774, and adding a mode as in 776. Changes to the clock database operations 760 can be saved by clicking on the button or interface indicated by 762 and/or a user can check the system as in block 764. A user can further view the details of the clock factory element MyClock 640 by clicking on the Config CFE button 720. Doing so will yield a view such as shown in FIG. 8.

In FIG. 8, shown is a illustrative example of how the contextual and scalable features of the invention permits a user to view more detail of the configuration view of clock factory element MyClock 640. What is presented herein is not limitative but rather illustrative; one of skill in the art will appreciate that other elements of clocking can be shown with as much clarity and usefulness offered by the CLOCK SPECIFICATION, GENERATION, AND INTEGRATION TOOL herein. MyClock 640 has an architectural view comprising a multiplexer function MUX 810 having five input signals, four signals 710, 712, 714, and 716 from oscillators and a control signal 812. Notice that even if it is known that these input signals originate in the top module from a PLL or other source, that information need not be presented to the user unless it needs to be considered in this configuration view. If all the information above, i.e., the cost, the power losses, the circuit diagram, the modes, the timing, etc., were displayed in a table, much of the information would not be relevant to a problem or topic at hand and the pertinent or critical information might be ignored. In this fashion, the CLOCK SPECIFICATION, GENERATION, AND INTEGRATION TOOL guides the chip designer/user to consider only those parameters necessary to achieve a correct-by-construction circuitry and design flow. The next component of MyClock 640 is a math module 814 set to divide-by-four having an output to a phase shifter 816 set to 180 degrees followed by a glitchless multiplexer GMux 820 from which the signal CLK_MyClock 642 is derived and output to the user module 420. The details of MyClock 640 described here are illustrative only and would probably differ from the components of MyClock2 650 which may also differ from the components of the clock factory element MC3 660. Again, the principle to be emphasized from these figures is that as a user needs greater details about a specific component, she/he need only activate one of the pervasive GUI features at the level of the component and only the pertinent information needed to guide a user regarding a particular function of that clock becomes available. So, by requesting greater information about MyClock 640, the details then are displayed and the user may manipulate or change some of the parameters, such as the clock source 880 and the frequency 890, the user clock name 892 and the output frequency 894, the PLL input 896 and frequency 898, the PLL out 912 and the frequency 914, the reset source 916 and/or the name of the reset source 918. If a parameter is not available to be changed, the CLOCK SPECIFICATION, GENERATION, AND INTEGRATION TOOL will indicate the choice is not available as by graying-out or otherwise not make a choice available.

Along the right of FIG. 8 is a listing of the advanced clock functions 840 that list each detail or component used in the creation of the clocks, e.g., source multiplexing 844 such as by Mux 810 in MyClock 640 that selects between the four input signals 710-716, source conditioning 846, math 848 such as the fixed divide-by-4 block 814 in MyClock 640, the edge control 852 which implements a phase shift of 180 degrees 816 and a glitchless multiplexer 854 using the GMux 820 having as input the output of the phase shifter 816, the alternate clock 718 and the glitchless mux control signal 822. The resulting output signal is CLK_MyClock 642 which is also input into the Reset Synch 830 which then outputs a reset signal RST_CLK_MyClock 644. Other clock factory elements may have other clock functions such as root gating 858, added root tap points 862, branch gating 862, and the timing is hidden in this diagram by the button 864. Advanced reset functions 850 such as adding an asynchronous reset 866, or multiplexing the reset source 868 or viewing the reset control features 868. Frequency synthesis 860 can be managed by viewing only the information relevant to synthesizing the clock signal, such as enabling frequency synthesis 874, allowing a user to configure a phase-locked loop 876 and showing/hiding the details of the PLL 878. Finally, a user can select the actions to be accomplished as in block 870 to either save or check the design 882 and 884, respectively. The RTL can be build in a hardware description language 886 or clocking constraints can be added as in block 888. The user is not burdened nor confused by extraneous information, that is nonetheless important to the design flow. The CLOCK SPECIFICATION, GENERATION, AND INTEGRATION TOOL in conjunction with the design flow simply guides the user to view clock specification data relevant to the aspect or function she/he is addressing.

FIG. 9 is yet another perspective of building a clock factory element in the generated module 410 and illustrates the features of MyClock 640 in a perspective of the available advanced clock functions 840. Note the correlation between the elements at the top of FIG. 9 and the advanced clock functions listed on the right of FIG. 8—they contain common elements: source mux 844, conditioning 846, math 848, conditioning, clock mux 547, test mux, root gate 856, tap points 858, branch gates 862, etc. The actual functions implemented in MyClock 640 are shown, such as the source mux 810, the fixed divide-by-4 814, the 180 degree phase shift 816, the glitchless muxing 820, etc. Note the input signals to the generated module 410 on the left in FIG. 9, and the output signals from the generated module 410 to the user module 420 shown on the right in FIG. 9.

FIG. 10 shows the available information if, supposing a user were interested in the specifications of the phase lock loop PLL_200, block 612 of FIG. 6 or when the select/configure PLL 874 of FIG. 8 function is enabled by one of the pervasive GUI mechanisms. Similar to the advanced clock functions of FIGS. 8 and 9, the advanced PLL functions of FIG. 10 are shown in the right of FIG. 10. Note that each of the advanced PLL functions on the right in FIG. 10 may correspond to a block whose parameters can be changed. The input reference signal and frequency to the PLL is shown in block 1024 as being an external reference input/output (I/O) signal having a frequency of 100 MHz. The signal may or may not be conditioned as in block 1026, and in block 1028, the signal is divided by four by a signal divider yielding a signal of 25 MHz. In block 1054, this signal is acted upon by a feedback multiplier of 3-75 MHz divider. It is useful to view FIG. 10 alongside FIG. 12a. FIG. 12a shows a sequence of elements comprising a PLL at 1210 whereas FIG. 10 shows the details of the elements. The details of the lock loop 1212 in FIG. 12a are shown in FIG. 10 as blocks labelled Controls 1030, PLL 1032 and Fdbk Div 1054. A user is able to change the characteristics of the elements in either figure and view the effects of the change in different contexts. For instance, if a user were to change either the value of the PLL Input Divider as in 1052 or the value of the PLL Multiplier 1054, the value of PLL Out at 1056 will change; these values of the frequencies can be shown or hidden simply by clicking on block 1038 "Show/Hide Timing." Another important feature offered by the CLOCK SPECIFICATION, GENERATION, AND INTEGRATION TOOL is that only the minimum specification need be configured; not only is superfluous information not presented to a user but also superfluous data is not requested or required from the user. In some cases, all that is needed from the user to complete a correct-by-construction clock specification is to specify a clock source and a clock output. The user is asked only for the minimal specification data and the CLOCK SPECIFICATION, GENERATION, AND INTEGRATION TOOL automatically completes the clock specification given the application set, the user's input, the design flow, and the customer's specifications, and/or other information known in the tools and libraries.

FIGS. 11, 12*a*, 12*b*, 12*c* shows a subsystem view of information that would be used to actually construct a clock factory element or needed to view the details of the blocks shown in FIG. 9. FIG. 11 shows yet how the minimal contextual paradigm of the CLOCK SPECIFICATION, GENERATION, AND INTEGRATION TOOL enables a user to view, modify, and integrate clock specifications into a design flow. These figures show icons of the functions available to create a clock factory. A clock tool bar 1108 allows for the creation of several new clocking elements 1110, such as a new clock factory 1112, a new PLL 1114, and/or a new reset clock function 1116. After a flow has been selected to be created, then individual elements as represented by the icons in tool bar 1120 can be selected by, e.g., a drag-and-drop technique or other known graphical user technique. Icon 1122 indicates that a user may wish to create a new source and resolves the issues of whether the source can be created without a clock. The source of the clock, if known, automatically appears in a block such as 1140 which may also display a known name and frequency of the signal. Icon 1124 adds an inverter; icon 1126 adds a math element. Each element can be expanded further, such as seen in greater detail in FIG. 12*c* wherein the math icon 1126 has been expanded and a user is able to change the math to or from divide-by-4 as in block 1260 by a pulldown menu or can add custom math as noted. Returning to FIG. 11, element 1128 may be applicable only to phase locked loops and contains the user interfaces by which a locked loop can be integrated along with the math in the feedback loop. Note that in FIG. 11, the locked loop element 1128 is grayed out, indicating that this particular function is not available when creating a clock flow. A second inverter icon 1130 can be dragged and dropped into the flow when creating a clock factory element, and inject icon 1132 automatically adds a multiplexer where the icon may be placed. Reset gates can be added using the icon 1134 and branch gates can be added with the icon 1136. Icon 1138 adds a tap to the sequence. Again, the number and choice of icons can vary according to the functions to be implemented when creating a clock factory element, or when creating a phase locked loop, or when creating a reset clock. The CLOCK SPECIFICATION, CREATION, AND INTEGRATION TOOL simply displays the icons and elements in an understandable and meaningful presentation for a particular clocking signal or the particular clock factory element or other aspect of the clock. If the user, moreover, does not need to specify additional detail, meaningful defaults are provided.

It is useful to view FIG. 11 alongside FIGS. 8 and 9 to fully appreciate the flexibility and the power that can be achieved over the various levels of control with the context-driven information paradigm implemented in the CLOCK SPECIFICATION, CREATION, AND INTEGRATION TOOL, i.e., the information available on the display or other user interface mechanisms is only pertinent to a function selected by the user. FIG. 11 shows three clock factory elements: a first clock factory element A 1142 named JBWCLK CFE; a second clock factory element B 1156 named DBD and a third clock factory element 1194 named DBDCLK. Note that with the first clock factory element JBWCLK CFE 1142, only four icons or symbols are displayed: a linked timing symbol 1106 indicating a clock relationship in the physical and logical realms outside the clock factory element JBWCLK CFE 1142, the clock factory element JBWCLK CFE 1142 itself, and the output clock signal named clk_JBWCLK 1144 having a frequency of 93.44 MHz. To further demonstrate the scalability of the CLOCK SPECIFICATION, CREATION, AND INTEGRATION TOOL, these three elements are shown because, perhaps, the user may not need to view the details of the first clock factory element 1142 although the details could be shown such as described with respect to the second clock factory element 1156.

The second clock factory element named DBO 1156 has been expanded and even the first multiplexer element 1158 of the clock flow has been expanded. The input linked timing signals to the second clock factory element DBO 1156 are shown as signal FFFLI at 128 MHz 1152 and DDOCLK at 20 MHz which may be an optional source of a clock signal. The multiplexer 1158 has been expanded to show that one of the two signal names are selected. The multiplexer 1158 is followed by an inverter 1160, then a math element 1170, and a tap 1172. Note that the tap 1172 is flagged because it does not have a destination and requires the user to consider this warning. Following the tap 1172, is an inverter 1174. After the inverter, another signal JBWCLK 1176 is input into the clock and automatically the CLOCK SPECIFICATION, CREATION, AND INTEGRATION TOOL will insert a multiplexer 1178 in order for the clock factory element to select between signals. After multiplexer 1178 is a test multiplexer 1179 which is a required element and is typically nonconfigurable. A root gate 1180 and a branch gate 1182 follows the output of the multiplexers 1178 and 1179 and the output of the branch gate 1182 can be tapped at 1184 to access the signal DBD of 128 MHz. The output signals of the second clock factory element 1156 are clk_DBD 1186 at 93.44 MHz and clk_DBD_2 1188 also at 93.44 MHz. Again, it is to be emphasized here that these particular clocking elements within the clock factory element may or may not be unique; the sequence of the elements is shown to demonstrate that further detail of a chosen component can be obtained in a meaningful context.

The tapped output 1184 of the second clock factory element is input into a PLL 1192 which is then input into a third clock factory element C named DBDCLK CFE 1194. The output of the third clock factory element C 1194 is a signal named clk_JBWCLK 1198 at 93.44 MHz. Again, the point to be taken here is that the details of the third clock factory element are not shown except to the extent that it is part of the clocks within the generated module and it accepts as input an output of the second clock factory element DBO 1156. Note that other warning flags are presented in the FIG. 11: there is an unattached clock signal clk_JBWCLK at 1196 and the user becoming aware of the unattached clock signal can address it right away simply by hovering over block 1196 and the details of the clock signal arise.

FIG. 12*a* shows a flow for a phase-locked loop 1210 and note that the lock loop 1212, previously unavailable in FIG. 11, now becomes available for use in a phase locked loop. FIG. 12*b* illustrates the elements of a clock factory element 1220, such as described with respect to clock factory element DBO 1150 in FIG. 11. Some additional features concerning the sequence of elements are particularly useful, such as whenever a second signal source is or another signal source is injected, a multiplexer automatically appears as shown in FIG. 11 when signal 1176 JBWCLK is injected into the second clock factory element and a mux 1178 immediately follows. Details such as these enhance the interaction of the user with the context-driven displays of the CLOCK SPECIFICATION, CREATION, AND INTEGRATION TOOL.

The overriding and underlying theme throughout the CLOCK SPECIFICATION, CREATION, AND INTEGRATION TOOL is that only the necessary and minimum information is presented in a user-friendly manner to the user to view a clock specification and/or to integrate a clock into an integrated circuit. The many dimensions of complexity of managing clocks during the development of an integrated circuit is managed with the simplified graphics of the CLOCK SPECIFICATION, CREATION, AND INTEGRATION TOOL to allow a user to solve her/his problems rather than those of the design system while knowing that what she/he specifies will be correct-by-construction and that the design will not have to be redesigned, nor will the clock specifications have to be revered engineered. The view of what happens between an input to a clock, such as a reference I/O signal at the top module, down to an output signal at a SERDES hardmac, can be determined by a level of control—such as a high level or overview of a clocking specification of FIG. 6, or a system level view of FIG. 7, or a detailed view of the subsystem, such as FIG. 9, or detailed view of the components of FIGS. 8, 10-12c. Thus, a novice would be able to specify very complex clock circuits without additional detailed knowledge of the design flow beyond the logical specifications that she/he would generate.

While the description provides embodiments of the invention, the embodiments are considered illustrative and by way of example only and are not intended to be limitative. Rather, the invention is as claimed is:

What is claimed is:

1. A method to integrate clocks during the design of semiconductor products, the method comprising the steps of:
   (a) reading an application set comprising a platform and a description of the platform;
   (b) reading a customer's specification for an intended semiconductor product;
   (c) visually displaying a plurality of views/perspectives of a clocking structure of the application set;
   (d) for each of the views/perspectives, visually displaying and offering user interfaces to guide a user in the selection of parameters of the clock within the context of the view/perspective.
   (e) integrating the selected parameters, the customer's specification, and the application set into a design flow.

2. The method of claim 1, wherein the design flow is correct-by-construction.

3. The method of claim 2, wherein the design flow contains the minimal parameters to be correct.

4. The method of claim 1, wherein the plurality of views/perspectives comprises one or more of the following:
   (a) a hierarchical view;
   (b) an architectural view;
   (c) a circuit diagram view;
   (d) a timing view;
   (e) a mode view;
   (f) a cost view;
   (g) a printing view; and/or
   (h) a tabular view
   wherein features of the above views are displayed in each of the plurality of views/perspectives as it pertains to a context in a module and/or component.

5. The method of claim 1, wherein one of the plurality of views/perspectives further comprises a hierarchical view illustrating an origination of a plurality of clocks and a throughput of each of the plurality of clocks through each of a plurality of logical modules in a semiconductor platform to be designed into a semiconductor product.

6. The method of claim 5, wherein the plurality of logical modules comprise a top module, a core module, a generated module, and a user module.

7. The method of claim 4, further comprising acquiring greater detail about one or more of the plurality of clocks in each module; the detail acquired pertaining to one or more of the following parameters: number of clocks, a path of the clocks, related clocks, the source of clocks from one or more oscillators, reset clocks, timing, and phase.

8. The method of claim 3, further comprising viewing a sequence of a plurality of elements comprising a clock factory element, one or more of the plurality of elements selected from the group consisting of: a source multiplexer, a signal conditioner, a math function, an edge controller, a glitchless multiplexer, a root gate, a branch gate, timing, a reset, a test multiplexer, an inverter, and a signal input.

9. The method of claim 1, further comprising:
   (a) offering the user choices of clocking parameters that are correct throughout a design flow.

10. The method of claim 9, further comprising:
    (a) hiding clocking parameters not affecting nor affected by the user choices.

11. A method to integrate clocks during the design of semiconductor products, the method comprising the steps of:
    (a) reading an application set comprising a platform and a description of the platform;
    (b) reading a customer's specification for an intended semiconductor product;
    (c) visually displaying a plurality of views/perspectives of a clocking structure of the application set, the plurality of views/perspectives having parameters from one or more of the following: a hierarchical view, an architectural view, a circuit diagram view, a timing view, a mode view, a cost view, a printing view, a power consumption view, and a tabular view;
    (d) for each of the views/perspectives, visually displaying and offering user interfaces to guide a user in the selection of a minimal set of parameters of the clock within the context of the view/perspective, the parameters comprising a number of clocks, a throughput of the clocks, related clocks, the source of clocks from one or more oscillators, reset clocks, timing, and phase; and
    (e) integrating the selected parameters, the customer's specification, and the application set into a correct-by-construction clocking specification.

12. A clocking specification, creation, and integration tool, comprising:
    (a) means to input an application set and a customer's specification;
    (b) means to display clocking parameters of the application set in an architectural and logical view;
    (c) means to offer a user correct choices of a minimal amount of clocking parameters;
    (d) means to design any clocking components required in step (c); and
    (e) means to correctly integrate the customer's specification and the application set.

13. A tool for the design of semiconductor products, comprising:
    (a) a reader to acquire a clocking specification of an application set to be developed into a semiconductor product;
    (b) a customer's specification for the semiconductor product;
    (c) a configurer to render the clocking specification into a plurality of scalable contextual perspectives, each of the scalable contextual perspective displaying portions of the clocking specification and the customer's specification relevant to its perspective; and (d) a user interface within at least one scalable contextual perspective to guide a user to select at least one correct clocking parameter to integrate the customer's specification with the clocking specification of the application set.

* * * * *